July 13, 1965 H. J. H. GOERTZ 3,194,550
EXPOSURE APPARATUS
Filed Dec. 20, 1962 3 Sheets-Sheet 1

INVENTOR
HENRI J. H. GOERTZ
BY
ATTORNEY

July 13, 1965   H. J. H. GOERTZ   3,194,550
EXPOSURE APPARATUS
Filed Dec. 20, 1962   3 Sheets-Sheet 2
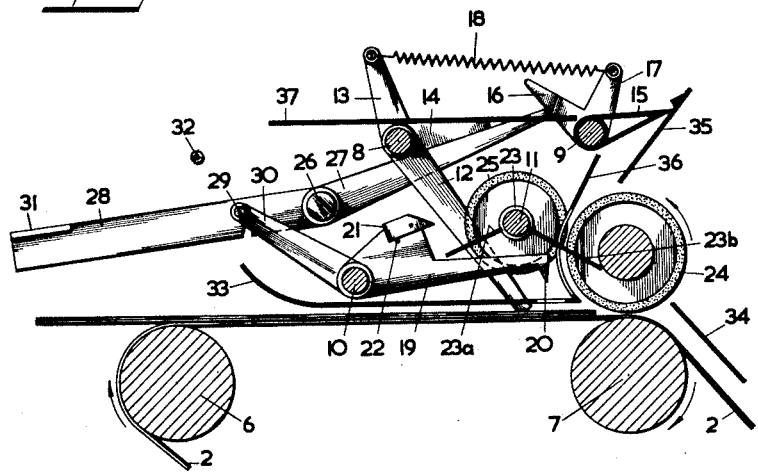
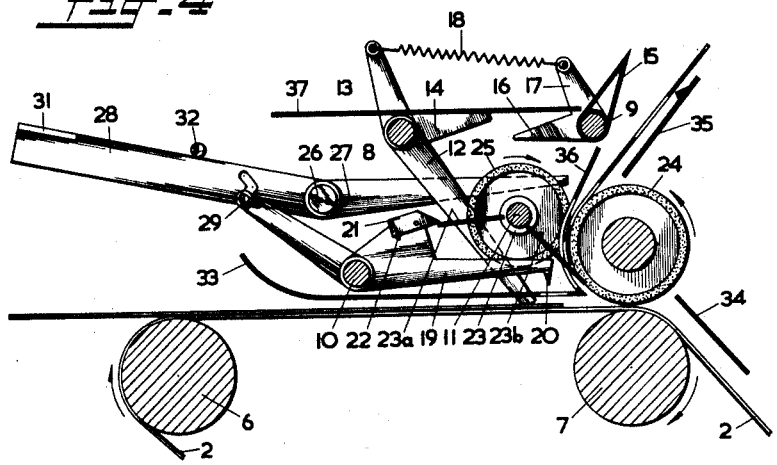
INVENTOR
HENRI J. H. GOERTZ
BY
ATTORNEY 3,194,550
EXPOSURE APPARATUS
Henri Jean Hubert Goertz, Venlo, Netherlands, assignor to Chemische Fabriek L. van der Grinten N.V., Venlo, Netherlands, a corporation of the Netherlands
Filed Dec. 20, 1962, Ser. No. 246,073
Claims priority, application Netherlands, Dec. 27, 1961, 272,952
9 Claims. (Cl. 271—3)

The invention relates to an exposure apparatus for contact-copying translucent sheet originals on light-sensitive sheet material. The invention is more particularly concerned with apparatus for the said purpose which is of the type equipped with means for feeding a single sheet or several superimposed sheets simultaneously, put in readiness in the feeding section of the apparatus, to the exposure section of the apparatus, a movable blocking device, which in one position arrests the sheet(s) and in the other position permits the sheet(s) to be carried along into the exposure section by feeding members, means for separating original and light-sensitive material after exposure, guiding members along which, after the separation, the original can be returned to the entrance of the exposure section with a view to making a further copy, a switch member included in the path followed by the original along the guiding members for controlling the movement of the blocking device, and a movable deflecting member which, when in one position, causes the original to move to the return guiding members after the separation, and, when in the other position, deflects the original to the ejection side of the apparatus. Such apparatus is later referred to herein as apparatus "of the type described."

Exposure apparatus in which, as desired, one or more copies of an original can be made automatically are known. Thus in Swiss patent specification No. 257,430 photoprinting apparatus of the above type is described which is equipped with electric switches which can be closed by the leading edge of the moving original and through which electromagnets are excited by means of which the feeding and cutting of light-sensitive material, and the separation of original and light-sensitive material after exposure, are controlled. One of the electric switches is located on the feeding side of the apparatus and serves as a detector which responds whenever an original travels past it. In that case it starts the device for feeding and cutting the light-sensitive material. Furthermore the apparatus is equipped with a manually operated movable deflecting member, which in one position guides the original out of the apparatus and in the other position is inoperative, so that the original returns to the feeding side of the apparatus with a view to making the next copy.

Another apparatus, of a complicated construction, is described in French patent specification No. 1,227,058. In this apparatus the feed of originals and light-sensitive material and the return of the original is controlled by a complicated system of cams and pawls.

Although these known forms of apparatus may operate reliably, they suffer from the disadvantage that it is necessary to move a deflecting member by hand in order to eject an original from the apparatus when the desired number of copies have been made. This action involves loss of time and makes for errors on the part of the operator of the apparatus.

It is the object of the invention to furnish, by simple and inexpensive means, a simple and reliable apparatus, which is particularly suited for office use and from which an exposed original is automatically ejected when the desired number of copies have been obtained.

In this connection further reference is made to the conventional photoprinting apparatuses, which are equipped with automatically operated members for controlling the feed of originals and light-sensitive sheets, the attachment of the originals to the exposure cylinder, and the ejection of the originals after exposure. These members (automatic sheet feeders, sequence timers, adjustable counting mechanisms, clamping devices and the like), however, are too expensive and their construction is too complicated for application in a simple apparatus for office work.

According to the present invention, apparatus of the type described is equipped with a detector, in the feeding section, which responds to the presence of a sheet in said section, and with means for passing the response of the detector to the movable deflecting member, whereby the movable deflecting member is automatically located in the returning position when a sheet is present in the feeding section, and in the ejecting position when the feeding section is empty.

By this means it is arranged that, providing, the operator has put a sheet of light-sensitive material in readiness in the feeding section of the apparatus, with the leading edge of the sheet against the blocking device, the original is returned to the exposure section. When the returning original reaches the entrance of the exposure section, the blocking device is put in the non-arresting position and the sheet of light-sensitive material enters the exposure section together with the original, and thus the next copy of the original is made.

When the desired number of copies of an original have been made (and accordingly the operator of the apparatus does not put in readiness a fresh sheet of light-sensitive material), the detector does not respond and the movable deflecting member returns to its ejecting position. When the original leaves the exposure section, it is ejected from the apparatus via the deflecting member, for instance to a delivery table.

The switch member which serves to control the movement of the blocking device and which is mounted in the path followed by the original when it is returned to the entrance of the exposure section, may be an electric switch member, such as is used in the apparatus described in Swiss patent specification No. 257,430; it may also be an electronically controlled device (photoelectric cell equipment and the like), responding to the passage of the leading edge o fthe original. A particularly advantageous control device is a lever system extending between the guiding members, which is deflected upon the passage of the leading edge of an original moving along the guiding members and which then in turn puts the blocking device for a moment in the non-arresting position, so that a sheet put in readiness is fed into the exposure section by the feeding members.

It is desirable that it should also be possible to put the blocking device from one position into the other by hand. To this end the apparatus may be provided with a second switch member for the displacement of the blocking device, or the switch member in the return path of the originals may be constructed in such a way that it responds not only to the passage of the leading edge of a returning original, but also to manual operation.

The detector in the feeding section of the apparatus according to the invention may be, for instance, an electric switch, which is closed when a sheet is put in readiness in the feeding section and via which an electromagnet capable of displacing the deflecting member is excited. However, a simple mechanical construction in which the detector is a hinged lever which is coupled to the movable deflecting member via a lever system is also very suitable. In this construction the lever is mounted in such a way that it is deflected when a sheet is put in readiness.

An advantageous construction for continuously operating exposure apparatus (apparatus in which the materials to be exposed are passed through the exposure section with an uninterrupted movement) is one which makes it possible to interrupt the cooperation between detector and deflecting member as desired; such a provision makes it possible for the deflecting member to be in the ejecting position, although sheet-shaped material lies ready in the feeding section. Thus, each time, one copy can be made of successive originals, as will be described in detail hereafter. In a device in which the detector is an electric switch and the deflecting member is displaced electromagnetically, this can readily be achieved, for instance, by interrupting the electric connection between detector and deflecting member by means of an additional switch.

In apparatus equipped with a mechanical coupling between detector and deflecting member the interruption of the coupling may be brought about, for instance, by removing one of the coupling bars from the lever system.

However, in such an apparatus a construction in which the coupling is not interrupted entirely but only changed temporarily, in such a way that the original situation can easily be restored, is more useful. According to the invention such a construction may be achieved by including an elastic variable-length connection in the lever system which couples detector and deflecting member. In a preferred embodiment the elastic variable-length connection is a helical spring.

The advantage of the above-mentioned constructions with an interruptable or changeable coupling between detector and deflecting member is that, even while the last of the desired number of copies of an original is being made, the exposure set of which the next original forms part may be fed into the exposure section. While this set enters the exposure section, the coupling between the detector and the deflecting member is interrupted or changed, so that the deflecting member returns to the ejecting position. The preceding original, which is copied for the last time, then no longer returns to the exposure section. The leading edge of the new set may be just behind the trailing edge of the preceding original. During operation with such a device it is therefore not necessary to delay copying the next original until the preceding original has completely left the exposure section. In practice this saves a good deal of time, in particular in copying poorly translucent originals (letters and the like) which are fed through the exposure section with a relatively low speed. If during the ejection of the preceding original the coupling between detector and deflecting member is made normal again, the deflecting member proceeds to the returning position (because the detector responds to the presence of the new set); thereafter the original of the new exposure set traverses the exposure section whenever light-sensitive material is put in readiness and fed into the feeding section of the apparatus.

According to the invention the apparatus may also be constructed in such a way that the detector in the feeding section operates an electric switch, which controls the movement of the movable deflecting member.

In one useful embodiment, the apparatus according to the invention is equipped with a manually operated switch member, which upon operation puts the deflecting member in the ejecting position and the blocking device in the non-arresting position, while rendering the means for passing on the responses of the detector inoperative.

If the apparatus according to the invention is constructed in such a way that the blocking device and the deflecting member are moved electromagnetically and the detector is an electric switch, the manually operated switch member may be a composite electric switch, which, when operated, interrupts the excitation circuit for the electromagnet of the deflecting member and at the same time closes an excitation circuit for the electromagnet of the blocking device.

If, however, the apparatus is equipped with a detector in the form of a lever extending in the feeding section and mechanically coupled with the deflecting member, the manually operated switch member will preferably be designed as a hinged lever which upon operation puts the blocking device in the non-arresting position, puts the deflecting member in the ejecting position, moves the detector outside the feeding section, and simultaneously interrupts or changes the length of the coupling between detector and deflecting member.

If with such an apparatus large numbers of originals have to be copied and only one copy of each original is required, the apparatus is moreover preferably constructed in such a way that the manually operated switch member can easily be fixed in the position in which it has put the deflecting member in the ejecting position and the blocking device in the non-arresting position. The automatic operation of the apparatus is then discontinued and the various sets can be successively fed right away without interruption, and all the originals are ejected from the apparatus after one copy of them has been made.

A structurally convenient and simple form of the invention is furthermore obtained if the apparatus is designed in such a way that the switch member in the return path of the originals engages with certain parts (such as pawls) of the blocking device, which are adapted to pivot in relation to the latter in such a way that upon the passage of an original through the return path the switch member forces or keeps those pivoting parts against a stop of the blocking device and thus causes the blocking device to move to the non-arresting position, while the switch member, when moved in the contrary direction, causes the pivoting parts to pivot away from said stop and the blocking device does not move.

Specific forms of apparatus according to the invention will now be described with reference to the accompanying drawings, in which:

FIGURES 2, 3 and 4 are partial, diagrammatic longitudinal cross-sections of the apparatus according to FIGURE 1, in which the most important parts of the apparatus are shown in several positions and stages of the treatment of an original and a sheet of photoprinting material.

FIGURE 5 is a diagrammatic cross-section of a device according to the invention, in which the detector in the feeding section is an electric switch and the deflecting member can be moved electromagnetically.

Figure 1:
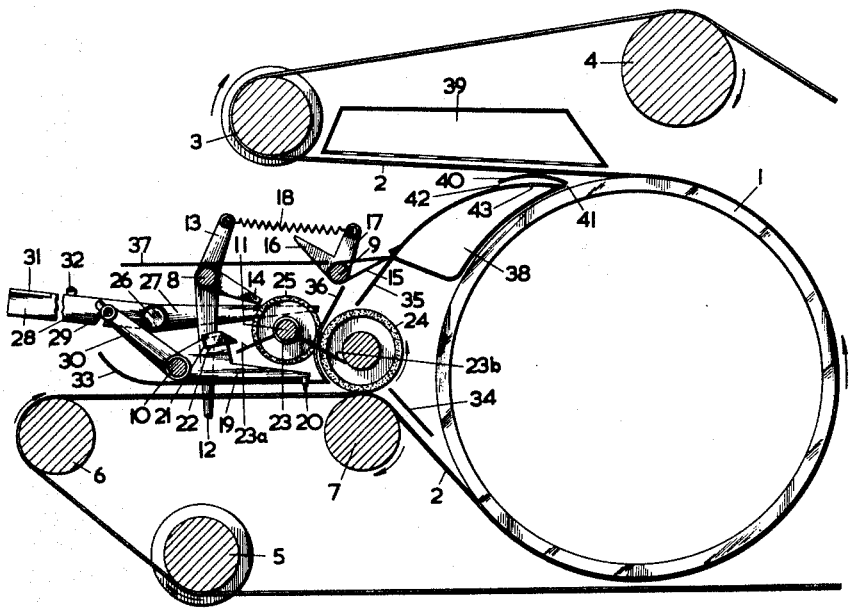
FIGURE 1 is a partial, diagrammatic longitudinal cross-section of a preferred embodiment of the apparatus according to the invention.

In FIGURE 1, the numeral 1 designates an exposure cylinder of glass, inside which the copying light-source (not shown) is mounted; 2 is a system of parallel endless conveyor belts, which are stretched over cylinder 1, guide rollers 3, 4, 5, 6, and 7 and some guide rollers which are not shown. One of the guide rollers may also act as a driving roller for driving the cylinder 1 and the belts 2. In the frame plates of the apparatus the shafts 8, 9, 10, and 11 are rotatably supported. On the shaft 8 a detector 12 is mounted, the thin end of which can be moved between the belts 2. On one end of the shaft 8 levers 13 and 14 are also rigidly mounted.

Attached to the shaft 9 is a deflecting member 15 (such as a plate or wire-grate construction), which extends over the whole working width of the apparatus, whilst on one of the ends of the shaft 9 levers 16 and 17 are rigidly mounted. The levers 13 and 17 are coupled together by the helical spring 18. On the shaft 10 a number of members 19 (for instance two) are rigidly mounted at some distance from each other (for instance 10 cm.); they are mounted in such a way that their angularly bent ends 20, which act as a blocking device, can pass between the belts 2. Each member 19 carries a small shaft on which a pawl 21 is supported. Gravity forces the pawls 21 against stops 22.

Fixed on the shaft 11 are a number of two-legged tumblers 23, which have been mounted in such a way that one leg (23a) is able to contact a pawl 21. The other leg (23b) extends into a groove in a conveyor roller 24 and acts as a mechanical detector for the originals returning to the exposure section. The tumblers act as automatically operating switch members for controlling the blocking device. Between the members 23 and on both sides thereof, conveyor rollers 25 are rotatably supported on the shaft 11.

Supported on pivot 26 is a two-levered manually operated switch member; its lever 27 is able to cooperate with the levers 14 and 16, whilst lever 28 is provided with an angularly bent slot into which a pin 29 can slide, said pin being fixed to the end of a lever 30, which is rigidly mounted on the shaft 10. Attached to the lever 28 is also a key 31.

The apparatus is furthermore provided with a stop 32, with guide plates 33, 34, 35, and 36, and with a delivery table 37. Plates 35 and 36, conveyor roller 24, and rollers 25 form part of the guiding members along which an original can be returned to the exposure section.

Moreover the apparatus is equipped with means for separating original and light-sensitive material after exposure. These means comprise a box 38, which is connected to the blowing side of an air pump (not shown), and a box 39, which is connected to the suction side of an air pump (not shown). Above box 38 a screen 40 is mounted in such a way that narrow slits 41 and 42 are formed between the edges of screen 40 and the wall of the box. Via openings 43 in the wall of the box 38 air is blown through the slits 41 and 42. The air flowing out through the opening 41 blows a photoprinting set leaving the exposure section off the exposure cylinder 1 and against the belts 2. The air blown out through the slit 42 flows along the wall of the box 38; by this air-current a partial vacuum is produced between the belts 2 and the box 38.

A set coming from the exposure cylinder 1 and blown against the belts 2 is passed between the belts 2 and screen 40. By the vacuum which is produced by the air-current coming from the slit 42 the sheet (original) that is turned away from the belts 2 is drawn towards the box 38 and thus separated from the other sheet (light-sensitive material), which is sucked against the belts 2 and thus conveyed further by the suction of the box 39.

The apparatus is furthermore equipped with means (not shown) for conveying exposed light-sensitive material further, for instance to a developing device combined with the apparatus.

After the apparatus has been started, the cylinder 1, the belt system 2, the rollers 3, 4, 5, 6, 7, and 24 are driven in the direction indicated by the arrows; the other members are in their position of rest (see FIGURE 1).

Figure 2:
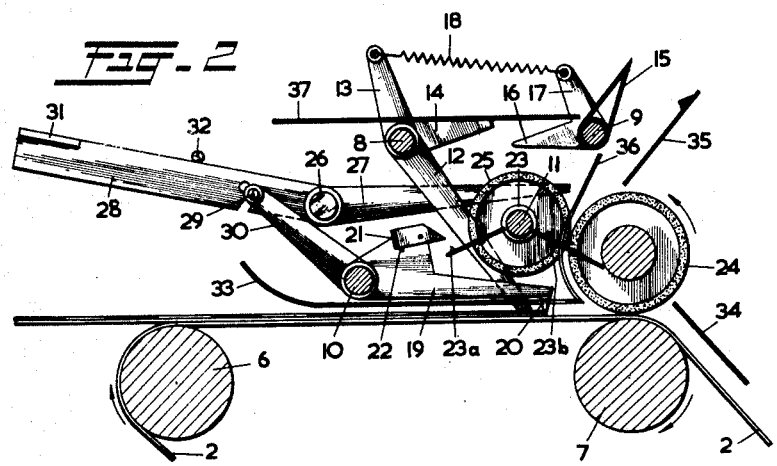

When a copy is to be made the exposure set (original and sheet of light-sensitive material) is fed over the belts 2 into the apparatus as far as the parts 20 of the members 19, which act as a blocking device. The leading edge of the set displaces detector 12, in consequence of which the deflecting member 15 coupled therewith is put in the returning position (see FIGURE 2). The belts 2 pass underneath the arrested set. The operator of the apparatus then depresses key 31. The lever 27 then presses against lever 16, as a result of which the deflecting member 15 returns to the position of FIGURE 1, whilst the spring 18 is tensioned. While the pin 29 slides into the slot in lever 28, lever 28 displaces lever 30, and consequently the members 19 are displaced and the blocking device is put in the non-arresting position. The exposure set is then conveyed further by the belts 2 (see FIGURE 3). Between the rollers 7 and 24 and via guide 34 the set is fed to the exposure cylinder and subsequently, being clamped between the surface of the cylinder 1 and the belts 2, is fed around the copying light-source to be exposed.

When the set has moved on until its leading edge has been gripped between the rollers 7 and 24, the key 31 can be released. The levers 27 and 28 then return to their original position; spring 18 is eased and the deflecting member 15 returns to the returning position, while the lever 30 and the members 19 return to the arresting position. The blocking device then rests on the moving exposure set.

If more than one copy of the original in question has to be made, a new sheet of light-sensitive material can be fed immediately after key 31 has been released. This sheet is then taken along by the exposure set that is being fed and by the belts as far as the stops 20 of the blocking device. The new sheet keeps detector 12, and consequently also deflecting member 15, in the returning position, even when the exposure set has been fed completely.

After the exposure, original and light-sensitive material are separated. The exposed light-sensitive material moves along with the belts 2 past the suction box 39 and is passed, for instance, to a developing device; the original is removed from the cylinder 1; it follows the wall of the box 38 and is guided between deflecting member 15 and guide plate 35 to the conveyor roller 24. With the aid of the conveyor rollers 25 and the guide plate 36 it is guided around the roller 24. The leading edge of the original thus contacts the legs 23b of the tumblers 23, which are located in the grooves of the roller 24. The tumblers will turn, so that the other legs 23a contact the pawls 21 and thus lift the members 19 for a moment (see FIGURE 4). The blocking device is put in the non-arresting position and the sheet lying ready is taken along by the belts 2. Between the rollers 7 and 24 the sheet of light-sensitive material thus fed meets the original that has been returned, and forms therewith a new exposure set, which is guided to cylinder 1. The legs 23a of the tumblers 23 can displace the members 19 by means of the pawls 21 over a short distance only; after this, the members 19 are released again and the blocking device returns to the arresting position. When the members 19 are displaced, lever 30 turns too; pin 29 moves into the slot in lever 28, but without moving this lever.

If no new sheet of light-sensitive material is put in readiness now, detector 12 and deflecting member 15 return to their original position when the trailing edge of the light-sensitive sheet has moved past detector 12. The tumblers 23 return to their original position when the trailing edge of the original has moved past them (the members 19 in this case are not moved, but the pawls 21 pendulate round their shafts for a moment).

After the exposure, when original and light-sensitive material have been separated, the original returns no more to the exposure section; via guide plate 35 and the upper side of deflecting member 15 it is delivered onto table 37.

If, after an original has been copied, it is desired to go on at once to copy the next original, the new exposure set (new original and sheet of light-sensitive material) is put on the belts 2, or on the last light-sensitive sheet already being fed, on which the preceding original still has to be copied. This new set is then taken along as far as the stops 20. As soon as the last sheet in question has been fed, key 31 is depressed, so that the stops 20 rise (blocking device in the non-arresting position) and the deflecting member 15 is brought into the ejecting position. The new set then enters the apparatus, while the original of the preceding set, after leaving the exposure section, passes to the delivery table 37 across deflecting member 15. If key 31 is released after the preceding original has been ejected, while the next set is still passing underneath detector 12, spring 18 draws deflecting member 15 into the returning position. The new original, providing new light-sensitive material is put in readiness, is returned to the exposure section.

Figure 3:
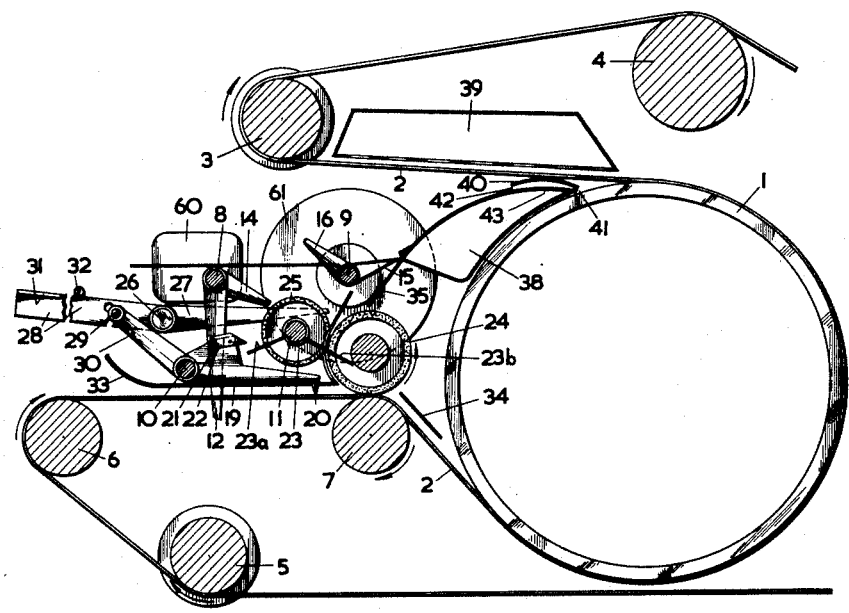

If a large number of originals have to be copied and only one copy of each original is required, the detector and the movable deflecting member are rendered inoperative by arresting the levers 27 and 28, for instance by fixing key 31 in the position of FIGURE 3 with the aid of a gripper catch; the apparatus then operates in the same way as the conventional non-automatic exposure apparatus.

A particularly attractive feature of the apparatus described is that its automatic operation is achieved with very simple means, without the use of expensive cam discs, devices for attaching the original to the cylinder, and the like. Moreover it is a great advantage that the automatic operation depends on the movement of the leading edge of the original; thus, disturbances of the register between original and light-sensitive material, which are due to displacements between original and exposure cylinder and may occur, for instance, in apparatus controlled with the aid of cam discs, practically cannot occur.

An attractive feature of the apparatus as compared with the conventional non-automatic office apparatus is that it is not necessary to combine original and diazotype paper by hand to a set before each exposure. This circumstance and the fact that less attention has to be paid to a proper "register" between original and diazotype paper produce a considerable saving of time; especially if, as is often the case with office work, a few copies of each of a large number of originals have to be made.

The apparatus according to FIGURE 5 is largely of the same construction as that of FIGURES 1-4; the only difference is that the shaft 8 of the detector 12 is coupled to an electric switch 60 and the shaft 9 of the deflecting member 15 is coupled to a (rotary armature) electromagnet 61. The switch 60 is designed in such a way that its contacts are closed when the lever 12 has been deflected by sheet material present in the feeding section of the apparatus.

An electric circuit has then been closed, by means of which the coil of the magnet 61 is excited. The armature of the magnet 61 is then displaced, the shaft 9 being turned until the deflecting member reaches the returning position (compare FIGURE 2). When the key 31 is depressed, the deflecting member 15 is brought into the non-returning position through cooperation of the levers 27 and 16, against the operation of the magnet 61. Otherwise apparatus operates in the same way as the apparatus according to FIGURES 1-4; it also has the same advantages.

I claim:

1. Exposure apparatus for contact-copying translucent sheet-shaped originals on sheet-shaped light sensitive material, comprising an exposure section, a feeding section having therein feeding members leading to the exposure section, and an ejection zone leading away from the latter, means for feeding a single sheet or several super-imposed sheets simultaneously, put in readiness in said feeding section, to said exposure section, a movable blocking device, which in one position arrests the sheet(s) and in another position permits the sheet(s) to be carried along into the exposure section by said feeding members, means for separating original and light-sensitive material after exposure, guiding means for returning an original, after the separation, to the entrance of the exposure section with a view to making a further copy, switching means including a switch member disposed in the return path followed by the original along the guiding means for controlling the movement of the blocking device, and a movable deflecting member which, when in one position, causes the original to move to said guiding means after the separatoin and, when in another position, deflects the original to said ejection zone, the said apparatus further comprising a detector means, in the feeding section, which responds to the presence of a sheet in said feeding section, and means for passing the response of the detector means to the movable deflecting member, whereby the movable deflecting member is automatically located in its said one position when a sheet is present in the feeding section and in its said other position when the feeding section is empty.

2. Exposure apparatus according to claim 1, wherein the detector means comprises a hinged lever which is mechanically coupled to the movable deflecting member via a lever system.

3. Exposure apparatus according to claim 2, wherein an elastic variable-length connection is included in the lever system.

4. Exposure apparatus according to claim 3, wherein the variable-length connection is a helical spring.

5. Exposure apparatus according to claim 1, wherein there is an electric switch which is operated by the detector means and which controls the movement of the movable deflecting member.

6. Exposure apparatus according to claim 1, which further comprises a manually operated switch member which, upon operation, puts the deflecting member in its said one position and the blocking device in its said other position, while rendering inoperative said means for passing the response of the detector means.

7. Exposure apparatus according to claim 6, including means for releasably fixing said manually operated switch member in a position in which it has put the deflecting member in its said one position and the blocking device in its said other position.

8. Exposure apparatus according to claim 1, said switch member being displaceable by an original passing through said return path, said switching means also including a switching element operated upon such displacement of said switch member to move the blocking device momentarily to its said other position and then to release the blocking device for return to its said one position.

9. Exposure apparatus according to claim 8, said switching means comprising a tumbler having thereon first legs and second legs respectively constituting said switch member and said switching element, said blocking device comprising pawls protruding into the path of movement of said second legs.

References Cited by the Examiner

UNITED STATES PATENTS

| 3,089,746 | 5/63 | Beyer | 271—3 X |
| 3,100,112 | 8/63 | Davis et al. | 271—3 X |

ROBERT B. REEVES, *Primary Examiner.*

RAPHAEL M. LUPO, SAMUEL F. COLEMAN,
*Examiners.*